March 17, 1959
V. SCHLEYER
2,877,995
COOLING TOWER
Filed June 29, 1955
2 Sheets-Sheet 1
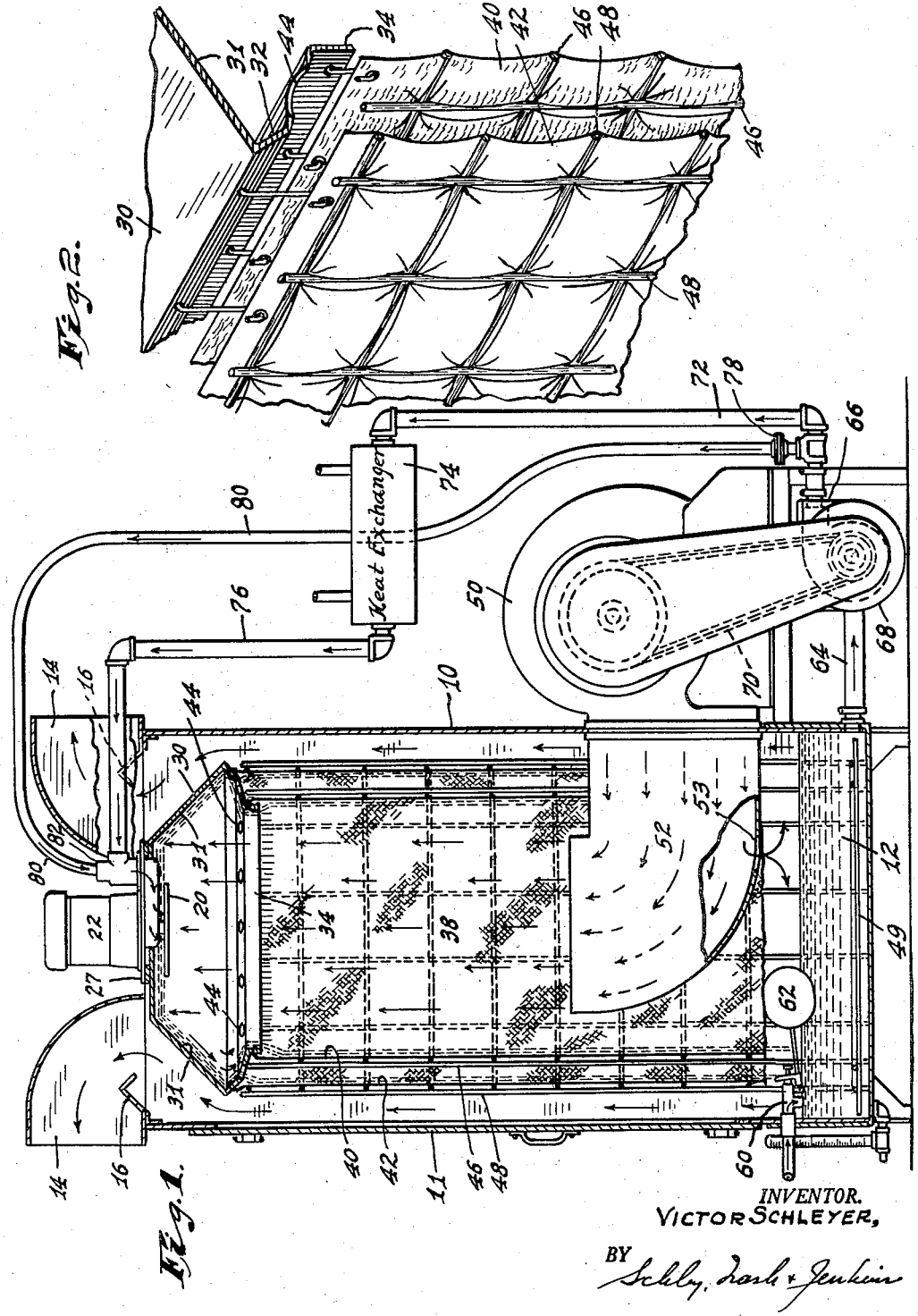
INVENTOR.
VICTOR SCHLEYER,
BY
ATTORNEYS.

March 17, 1959 V. SCHLEYER 2,877,995
COOLING TOWER
Filed June 29, 1955 2 Sheets-Sheet 2

INVENTOR.
VICTOR SCHLEYER,
BY
ATTORNEYS.

United States Patent Office 2,877,995
Patented Mar. 17, 1959

2,877,995

COOLING TOWER

Victor Schleyer, Anderson, Ind., assignor to E. C. Schleyer Pump Company, Inc., Anderson, Ind., a corporation of Indiana Application June 29, 1955, Serial No. 518,885

4 Claims. (Cl. 261—30)

This invention relates to evaporative cooling apparatus, and especially to a cooling tower to dissipate heat from cooling liquid, as in air-condition systems. Water is commonly used as a cooling liquid, and will be referred to as representative of the liquids which may be used.

It is a primary object to provide a cooling tower which will produce improved evaporative cooling, which will be less expensive and more effective than prior towers, which will be more compact and require less space than prior towers, and which will be simple and reliable in construction and operation. It is an object of the invention to avoid the expense and bulk of trickling beds or lattice works used to provide wetted surfaces in prior towers, and to avoid the use of spray nozzles and the clogging difficulties which occur with them. It is an object of the invention to effect cooling by intimate contact of air and atomized liquid in a turbulence or mixing chamber and contact of the air with wet walls in and about the chamber. It is an object of the invention to ensure especially prolonged contact of the water and air, and to provide wet walls in an especially advantageous arrangement and configuration and as readily renewable and inexpensive curtains. It is an object of the invention to produce a more effective atomization of the water and a more effective admixture of the water with air. It is an object of the invention to provide an improved cooling tower in which the water is atomized at low pressure from a spinning disk atomizer. It is an object of the invention to produce a minimum loss of water with the air passing through the tower. It is a further object of the invention to provide wetted surfaces which tend to retain suspended solids and thus to clarify and condition the water passing through the tower.

In accordance with the invention, water which has absorbed heat in a heat exchanger such as that of an air-condition system is fed in a low-pressure stream to a rotary atomizer, preferably a spinning disk atomizer, and discharged therefrom in an expanding annular sheet or spray at the top of a chamber. A forceful stream of air is discharged upward in the chamber into admixture with the expanding sheet of atomized liquid, and the mixture is deflected downward, as by a conical casing. Water is received on and drains downward along wetted wall surfaces arranged about the chamber. Preferably, the wall surfaces are wettable surfaces, pervious both to water and air; and are desirably provided by curtains hung about the chamber and supported outside by an open mesh framework. Air flow and pressure bows the curtains outward in the meshes of the framework, to form tortuous surfaces on both faces of the curtain, and causes air and water to seep through the curtain walls. Water is collected in a reservoir below the curtains and is returned to the heat exchanger. The air stream to the chamber, desirably supplied from a blower, is forcefully discharged from the central bottom portion of the chamber, upward through the chamber and into intimate admixture with the swirling water spray. A high degree of turbulence is obtained in the chamber and especially adjacent the curtain walls, which increases and maintains the intimate contact between the air and the atomized water. The mixture is also brought into prolonged contact with the wet walls, to deposit water thereon and to produce further evaporative cooling of the water draining downward along the walls. The air moves generally downward at the periphery of the chamber and escapes at the bottom, through outlets at the lower edges of the curtains. It is then preferably led upward along the outer faces of the curtains to one or more discharge vents at the top of the tower. Air movement through the tower, that is, from the blower discharge upward through the chamber then downward along the curtain walls and then upward to the vents, is at a progressively decreasing velocity. The air passing through the blower is dry air and the blower deteriorates less than it would if placed at the outlet and handled the relatively humid exhaust from the tower. Moreover, the initial relatively high velocity from the blower discharge produces highly effective mixing of the air with the water and contact of the air with the chamber walls. The subsequently decreasing velocity causes the water to separate from the air and to deposit on the walls and drop to the reservoir. The air escaping from the discharge vents of the tower contains substantially no entrained water, and water loss is held to a minimum.

A plurality of spaced curtains may be used about the chamber, and when spaced curtains are used, the air-water mixture is desirably passed between them. The innermost curtain wall may lie closely about the incoming upward stream of air, to direct that stream upward and separate it from the outer downward-moving air-water mixture. The curtains are readily removable for cleaning or replacement. They may be of various materials, and may be felted or woven fabric or screen material, such as felted synthetic fiber sheet, fabric woven of synthetic fiber such as nylon, woven glass fiber fabric, woven plastic screen, etc. The material is desirably a water-wetted material, preferably nonabsorbent, which is pervious both to water and to air. In a preferred large-size tower, an inner curtain of woven plastic screen (common window screen) is supported closely about the incoming air stream, and two spaced outer curtains of nylon or glass-fiber fabric are supported outward therefrom.

In contrast with the general practice in the industry, the tower is made as a self-contained unit, including the blower and the pump and the necessary motors for them and the atomizer. This permits the component parts to be suitably matched for high efficiency and low power consumption, and provides a unit which merely requires simple pipe connections to the heat exchanger. The water circulation system preferably includes a by-pass line which by-passes the heat exchanger and through which cooled water is pumped directly from the reservoir to the atomizer or into admixture with the heated water flowing from the heat exchanger to the atomizer. Such line contains an orifice plate which is sized in relation to the head imposed on the pump by the heat exchanger to obtain optimum delivery head and volume from the pump, and which ensures a proper flow of water through the tower. While the by-passed water tends to reduce the temperature of the water entering the tower, the presence of the by-pass adds flexibility to the tower unit and is found to provide increased efficiency.

The accompanying drawings illustrate the invention. In such drawing:

Fig. 1 is a vertical section of a cooling tower embodying the invention and connected to a diagrammatically-shown heat exchanger;

Fig. 2 is a partial isometric view on an enlarged scale, showing the wet-wall curtains;

Figure 3:
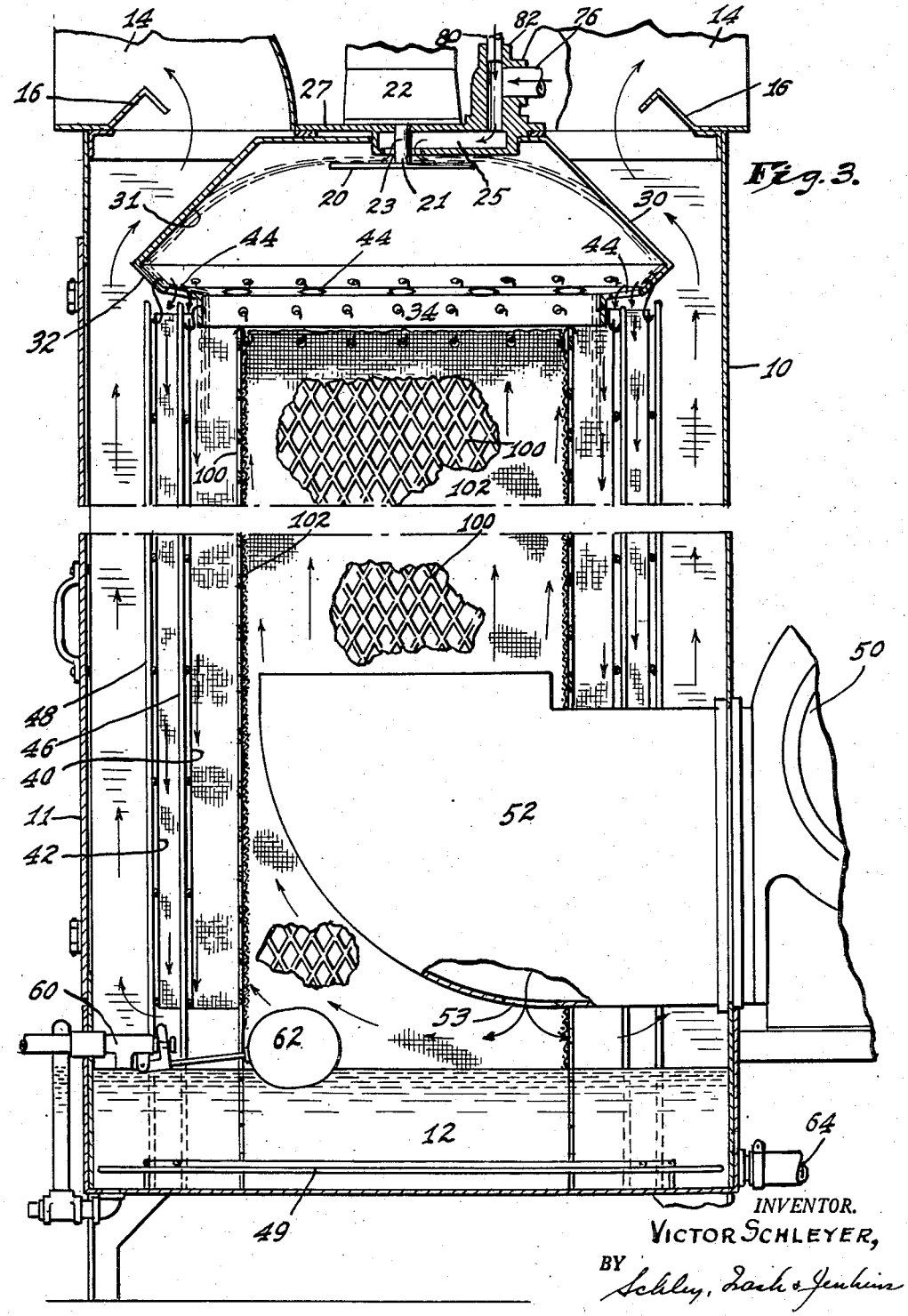
Fig. 3 is a section on an enlarged scale of a cooling tower similar to that of Fig. 1 but containing an inner air-directing curtain wall.

The towers shown in the drawings each comprises an upright casing 10 of rectangular cross-section, with a reservoir 12 formed at the bottom of the casing, and with the top of the casing provided with two air discharge vents 14. One side-wall 11 of the casing 10 is desirably removable for access to the interior of the tower. Angular baffle plates 16 in the vents 14 aid in preventing the loss of water with the air.

A spinning atomizing disk 20 is carried by the shaft 21 of a motor 22 supported on top of the housing 10. The disk lies at the top of the casing 10, and water is fed to its center through an annular throat 23 about the shaft 21, from a passage 25 in the motor-support casting 27. A conical casing 30 of rectangular cross-section, is supported around the atomizing disk 20, with its outer downward-sloping walls 31 in the path of the sheet-like stream of atomized water discharged from the disk 20. The lower edges of the walls 31 carry inwardly extending flanges 32 which terminate at their inner edges in depending walls forming a collar 34. The conical housing 30 may be circular in cross section, but is preferably rectangular as shown.

The space within the conical housing 30 forms the upper part of a turbulence or mixing chamber 38, the main lower part of which is defined by walls which are wetted by the water or other liquid used to produce the evaporative cooling. Preferably, the walls are formed as readily removable curtains, hung from above and supported on the outside by open mesh frames. In Fig. 1, two spaced curtains are used, each extending about all four sides of the central chamber 38. The inner curtain 40 is hung by suitable hooks from the depending collar 34, and extends downward to a point spaced above the normal level of liquid in the reservoir. The second curtain 42 is spaced outward from the first curtain 40, and is conveniently hung by suitable hooks from the outer portion of the flanges 32. When a plurality of spaced curtains are used, the spaces between the curtains are used as passages for air (or air and suspended water), and the passages may be arranged either in series or in parallel. In Fig. 1, the passage between the curtains 40 and 42 is in parallel with the main portion of the chamber 38, and flow in the passage is downward. The flanges 32 are provided with a series of spaced holes 44 leading from the conical casing 30 to the space between the two curtains.

To support the curtains against outward movement under the pressure of air in the mixing chamber and to shape their surfaces, wide-mesh frames 46 and 48 are positioned against the outer surface of the two curtains. Each frame consists of crossed vertical and horizontal bars or rods, secured together at their crossing points, and with the rods spaced by distances of the order of 4 to 6 inches. They thus form a square mesh pattern, but other patterns, such as a diamond pattern, can be used. The two frames 46 and 48 may be mounted in any convenient way, but are preferably supported on a base 49 resting on the bottom of the reservoir 12 and loosely centered therein by engagement with the casing walls. The frames may be made with their four sides permanently interconnected, but preferably at least one side of each frame, desirably the side adjacent the removable casing wall 11, is removably connected to the other sides and to the base 49, to facilitate removal and replacement of the curtains.

A blower 50 is mounted adjacent one outer wall of the tower 10 and its outlet is connected to an elbow 52 extending through openings in the wall and in the two curtains and their supporting frames 46 and 48. The elbow is turned upward to direct its main air-discharge stream upward along the center line of the mixing chamber 38 and through that chamber and into admixture with the atomized discharge stream from the atomizer disk 20. A smaller air stream may be discharged through an opening 53 in the bottom of the elbow to sweep across the surface of liquid in the reservoir.

The reservoir 12 is desirably provided with a make-up valve 60 controlled by a float 62 and connected to a water supply pipe, to replace water lost by evaporation and maintain the desired level of water in the reservoir. The reservoir 12 is connected through an outlet pipe 64 to a pump 66 mounted coaxially with an electric motor 68 which drives both the pump 66 and a belt drive 70 for the blower 50.

The cooling tower is diagrammatically shown as connected for dissipating heat received by the water in a heat-exchanger 74, which may be considered the heat-exchanger of an air conditioning system. The main discharge stream from the pump is carried by a pipe 72 to the heat-exchanger, to absorb therein the heat which is to be dissipated in the tower. From the heat-exchanger, the water passes through the pipe 76 to the feed passage 25 and the throat 23 leading to the atomizing disk 20.

Preferably, a predetermined quantity of cooled water is recirculated through the cooling tower without passing through the heat exchanger, and such water is desirably mixed with the heated water from the heat exchanger before entering the tower. As shown, a bypass stream of water is led off from the pump discharge through an orifice plate 78 and is carried by a pipe 80 to a mixing T 82 where it is mixed with the main discharge stream from the exchanger 74 before the water reaches the atomizing disk 20.

The cooling tower will normally operate continuously during the operation of the air conditioning or other system to which it is connected and of which the heat exchanger 74 forms a part. The pump 64 continuously pumps cool water from the reservoir through the exchanger 74, where the water absorbs heat, and through the discharge pipe 76 from the exchanger to the atomizing disk 20. The heated water flows in a continuous low-pressure stream through the open throat 23 to the center of the spinning disk 20, and is discharged from the disk in an annular expanding sheet or stream. As the water moves outward on the disk and is discharged from it, it is broken up into fine droplets which are thrown violently outward in a swirling path. The blower 50, driven by the same motor as the pump 66, continuously discharges a strong stream of air upward through the center of the mixing chamber and against the outward traveling sheet or stream of atomized water. The two streams are violently intermixed, and are violently impinged against the walls of the conical housing. The outward swirling mixture is deflected downward by and along the sloping walls of the conical housing 30, and inward by the inward flange 32. Part of the mixture passes downward through the openings 44 to the space between the two curtains. The remainder passes downward within the depending collar 34. There is thus an upward strong movement of air from the blower at the center of the chamber, an outward movement of atomized water and air at the top of the chamber, and a generally downward movement of water and air along the walls of the chamber, accompanied by violent swirling and turbulence. A rapid evaporative cooling effect is thus produced by the intimate and violent mixing of the air and the atomized water.

The pressure of air within the mixing chamber and in the space between the curtains forces the curtains out against the frames 46 and 48 and bulges them outward in the spaces of the frames. The curtain surfaces are thus given an undulated configuration, and the passage between the two curtains is formed into a tortuous path. Water collecting on the walls of the conical housing drains through the flange openings 44 and the collar 34 and is received on the curtains, where it wets them and runs down their surfaces. Water entrained in the turbulent downward-moving air-water mixture also collects on the curtains and drains downward along them. Water is absorbed by the curtains and passes through them to their outer surfaces. The curtains are thus thoroughly wetted, and further evaporative cooling occurs as the result of contact of the moving air with their variously-disposed surfaces, both in the chamber and in the passages between the spaced curtains. Air may also pass through the curtains and be cooled in such passage.

The main flow of air escapes from the chamber through the outlets between the lower edges of the curtains and the water in the reservoir, and thus passes across the exposed surface of the pool of water in the reservoir. It then moves upward along the outer face of the outer curtain, and is discharged through the vents 14.

During these air movements, the air velocity progressively decreases and water separates out from the air onto the curtains and to the reservoir. While the discharged air contains a high percentage of water vapor, substantially no water is discharged as such with the air through the vents.

The water is cooled in its passage through the tower, and the cooled water collects in the reservoir for recirculation through the heat exchanger circuit in the heating cycle.

The stream of water pumped from the reservoir may all be passed through the heat exchanger, and in such case the water entering the tower from the exchanger will be relatively hotter than when cooled water is recirculated direct to the atomizer. Preferably a limited quantity of cooled water is so recirculated, in an amount such that with the water passing through the heat exchanger the total flow and head gives optimum efficiency of the pump. The flow rate in the bypass is controlled by the size of the orifice in the orifice plate 78. The bypass water is preferably mixed with the heated water from the heat exchanger, and increases the volume of water passing through the tower and is found to improve the overall cooling efficiency.

The tower of Fig. 3 is similar to that of Fig. 1, and shows a modification which is especially preferred for large towers. In that modification, a third or inner wall is added. As shown, this comprises an open frame 100 formed of expanded-metal mesh in the common diamond-shaped mesh pattern, and supported from the same base 49 as the two outer wall frames 46 and 48. Its inner face is covered with a removable curtain 102 of small-mesh plastic screen such as that commonly used as window screen. The wall 100—102 stands closely about the discharge end of the elbow 52 and is spaced inward from the curtains 40 and 42. Its upper end lies within or slightly below the collar 34.

The inner wall 100—102 guides the air stream from the elbow 52 upward through the main body of the mixing chamber 38 to ensure the desired violence of admixture with the atomized water. It also defines with the outer curtain 40 an outer passage for the air-water mixture moving downward from the conical casing 30. It thus partially separates the upward-moving air at the center of the chamber from the swirling turbulent air-water mixture moving downward along the walls of the chamber. The inner wall 100—102 will be wetted by the water, and its open mesh will permit relatively free air seepage through it. It will thus not only serve to guide the air movements, but will provide additional wetted walls along which, and in the mesh of which further evaporative cooling will take place.

I claim as my invention:

1. Apparatus for evaporative dissipation of heat from liquid, comprising an upright chamber having side and top walls and having an air outlet at the base of said side walls, liquid-discharge means within the top of said chamber to discharge liquid outward from the center thereof in a volume substantially exceeding what will be evaporated during passage of the liquid through the apparatus, blower means to discharge a forceful stream of air upward in said chamber toward said liquid-discharge means into admixture and counter-current relation with liquid discharged therefrom to produce in said chamber a turbulent mixture of air and liquid under elevated pressure and moving generally along said side walls toward the outlet at the base thereof, said side walls comprising an open-mesh framework and wettable pervious curtain material hung against the inner face thereof through which liquid can pass outward from said elevated-pressure chamber to wet the outer surfaces of said side walls, said curtain material being pressed against the framework by the elevated pressure produced in said chamber by said air discharge means and being bulged outward by such pressure in the mesh openings of the framework to form undulated surface configurations on both faces of the walls, and means forming with said outer surfaces an air passage in which air from said chamber passes in contact with said outer surfaces, said pervious side walls serving to collect liquid from said discharge means and said air-liquid mixture and to drain the same downward, and a liquid reservoir below said walls to receive liquid draining therefrom.

2. Apparatus for evaporative dissipation of heat from liquid, comprising an upright chamber having side and top walls and having an air outlet at the base of said side walls, liquid-discharge means within the top of said chamber to discharge liquid outward from the center thereof in a volume substantially exceeding what will be evaporated during passage of the liquid through the apparatus, blower means to discharge a forceful stream of air upward in said chamber toward said liquid-discharge means into admixture and counter-current relation with liquid discharged therefrom to produce in said chamber a turbulent mixture of air and liquid under elevated pressure and moving generally along said side walls toward the outlet at the base thereof, said side walls being formed of wettable pervious material through which liquid can pass outward from said elevated-pressure chamber to wet the outer surfaces of said side walls, and means forming with said outer surfaces an air passage in which air from said chamber outlet passes upward in contact with said outer surfaces, said pervious side walls serving to collect liquid from said discharge means and said air-liquid mixture and to drain the same downward, and a liquid reservoir below said walls to receive liquid draining therefrom, said side walls comprising spaced inner and outer curtains positioned in upright position about said chamber vertically between said liquid-discharge means at the top and said liquid reservoir at the bottom, the space between said curtains being open at the top to said chamber to receive liquid and air therefrom, and being open at the bottom to said air outlet at the base of the side walls to discharge air thereto.

3. Evaporative cooling apparatus comprising a chamber having an upright side wall and an air outlet, means forming an air passage connected to said outlet and leading along the outer face of said wall to a discharge point, said air passage being separated from said chamber by said wall, liquid and air discharge means in said chamber to produce therein a mixture of air and liquid under a pressure higher than the pressure in said air passage, and to cause such mixture to flow successively across opposite faces of said wall, said side wall between said chamber and passage comprising an open-mesh framework and a curtain positioned on the side thereof toward said chamber, said curtain being of pervious fabric-like material through which liquid will pass outward from said higher-pressure chamber to wet the surfaces of the wall exposed to said air passage, and said curtain being flexible and being pressed against and through the meshes of said framework to form undulated surface configurations on both faces of said wall.

4. Apparatus for evaporative dissipation of heat from a stream of liquid, comprising an upright chamber, liquid discharge means within the top of said chamber to discharge an annular stream of liquid outward from the center thereof, blower means to discharge a forceful stream of air centrally upward in said chamber toward said liquid-discharge means into admixture with the liquid discharged thereby to produce in said chamber a turbulent mixture of air and liquid, side walls about said chamber comprising inner and outer spaced curtain walls each comprising a fabric-like curtain and an open-mesh framework support on the outer side thereof, said fabric-like curtain being of pervious material through which liquid will pass from the inside to wet the outside thereof, an air outlet for said chamber at the bottom of said curtain walls, the space between said walls having communication at the top with said chamber to receive liquid and air therefrom and opening at the bottom to said air outlet whereby to form a down-flow passage between the inner and outer walls, means forming an outer air passage leading upward from said air outlet along the outer face of said outer curtain walls, air discharge means adjacent the top of said outer curtain wall, and a reservoir below said curtain walls to collect liquid draining therefrom, said fabric-like curtains being pressed against and into the meshes of said framework by the air pressure in said chamber to form undulated surfaces on the faces of said curtain walls.

References Cited in the file of this patent

UNITED STATES PATENTS

| | | |
|---|---|---|
| 1,062,180 | Myers | May 20, 1913 |
| 1,283,154 | Godward | Oct. 29, 1918 |
| 1,436,483 | Cox | Nov. 21, 1922 |
| 1,543,853 | Hunziker | June 30, 1925 |
| 1,564,075 | Lakin | Dec. 1, 1925 |
| 1,728,740 | Wirt | Sept. 17, 1929 |
| 2,325,692 | Maddox | Aug. 3, 1943 |
| 2,546,479 | Sodano | Mar. 27, 1951 |
| 2,615,700 | Dixon | Oct. 28, 1952 |
| 2,639,905 | Dow | May 26, 1953 |
| 2,661,936 | De Vilbiss | Dec. 8, 1953 |
| 2,685,434 | Underwood | Aug. 3, 1954 |

FOREIGN PATENTS

| | | |
|---|---|---|
| 603,152 | Great Britain | June 10, 1944 |